United States Patent
Sato

(10) Patent No.: US 9,866,126 B2
(45) Date of Patent: Jan. 9, 2018

(54) GALVANIC ISOLATOR AND CIRCUIT USING GALVANIC ISOLATION

(71) Applicant: Renesas Electronics America Inc., Santa Clara, CA (US)

(72) Inventor: Tetsuo Sato, San Jose, CA (US)

(73) Assignee: Renesas Electronics America Inc., Santa Clara, CA (US)

( * ) Notice: Subject to any disclaimer, the term of this patent is extended or adjusted under 35 U.S.C. 154(b) by 0 days.

(21) Appl. No.: 14/922,269

(22) Filed: Oct. 26, 2015

(65) Prior Publication Data

US 2017/0117815 A1 Apr. 27, 2017

(51) Int. Cl.
*H02M 3/335* (2006.01)

(52) U.S. Cl.
CPC ... *H02M 3/33546* (2013.01); *H02M 3/33523* (2013.01)

(58) Field of Classification Search
CPC .............................. H02M 3/33546
USPC ........... 363/21.07, 21.04, 21.05, 21.06, 21.1, 363/21.11, 123–127
See application file for complete search history.

(56) References Cited

U.S. PATENT DOCUMENTS

| 6,389,063 | B1 | 5/2002 | Kanekawa et al. | 375/222 |
| 6,879,137 | B2* | 4/2005 | Sase | H02M 3/1584 323/282 |
| 2015/0229224 | A1* | 8/2015 | Werner | H02M 3/33515 363/21.13 |

* cited by examiner

*Primary Examiner* — Adolf Berhane
*Assistant Examiner* — Nusrat Quddus
(74) *Attorney, Agent, or Firm* — Campbell Stephenson LLP

(57) ABSTRACT

A method and apparatus for isolating voltages while transmitting data signals. In one embodiment of the method, a modulation circuit modulates a carrier signal using an input data signal. A demodulation circuit receives the modulated carrier signal via a first capacitor coupled in series between the modulation circuit and the demodulation circuit. The demodulation circuit also receives the carrier signal via a second capacitor coupled in series between the demodulation circuit and the circuit that generates the carrier signal. The demodulation circuit demodulates the modulated carrier signal using the carrier signal.

18 Claims, 5 Drawing Sheets

US 9,866,126 B2

GALVANIC ISOLATOR AND CIRCUIT USING GALVANIC ISOLATION

BACKGROUND OF THE INVENTION

Voltage isolators or galvanic isolators prevent direct current (DC) flow between two circuits. In other words, galvanic isolators eliminate DC paths. In addition, galvanic isolators enable data communication between two circuits. Galvanic isolators are often used when two circuits must communicate with each other, while their grounds are at different potentials.

There are several different types of galvanic isolators. A transformer is a galvanic isolator. Transformers isolate circuits, but enable data signals to pass between the circuits through use of magnetic flux. Optocouplers transmit data signals by light waves. The sender (e.g., light emitting diode) and receiver (photosensitive device) are not electrically connected. Capacitor based isolators use an electric field to transmit data signals across capacitor isolation barriers. U.S. Pat. No. 6,389,063 illustrates one or more examples of galvanic isolators.

SUMMARY OF THE INVENTION

A method and apparatus is disclosed for isolating voltages while transmitting data signals. In one embodiment of the method, a modulation circuit modulates a carrier signal using an input data signal. A demodulation circuit receives the modulated carrier signal via a first capacitor coupled in series between the modulation circuit and the demodulation circuit. The demodulation circuit also receives the carrier signal via a second capacitor coupled in series between the demodulation circuit and the circuit that generates the carrier signal. The demodulation circuit demodulates the modulated carrier signal using the received carrier signal.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Figure 1:
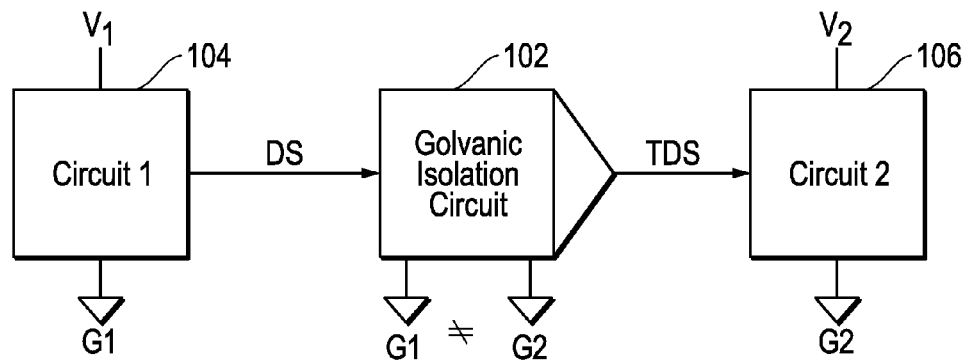
FIG. 1 is a block diagram illustrating an example galvanic isolation circuit that enables communication between circuits at different ground potentials.

FIG. 1 illustrates a galvanic isolation (GI) circuit 102 employing one embodiment of the present invention. The GI circuit 102 is coupled between circuits 104 and 106. Two circuits can be directly coupled together or indirectly coupled together via an intervening circuit or component (e.g., a capacitor).

Circuits 104 and 106 are coupled to supply voltages V1 and V2, respectively, and grounds G1 and G2, respectively. Each of grounds G1 and G2 may be floating, or one of the grounds may be floating. The potentials of G1 and G2 are presumed different; the potential of G1 is greater than G2, or the potential of ground G2 is greater than G1. As used herein, the term ground means a common return path in a circuit for electric current. V1 and V2 are also presumed to be at different potentials.

GI circuit 102 can transmit a data signal (e.g., a pulse width modulation (PWM) signal) from circuit 104 to circuit 106. The transmitted data signal is essentially the same as the data signal generated by circuit 104. To illustrate, circuit 104 generates a data signal DS, which includes AC components and a DC component. Each of the AC components has a different frequency. The transmitted data signal TDS includes most or all of the AC components of the data signal DS, the lower frequency AC components of which may be attenuated. The transmitted data signal TDS, lacks the DC component. In this fashion, GI circuit 104 galvanically isolates circuits 104 and 106 from each other while communicating data signals. In an extension of the present invention, several GI circuits 102 can be coupled in parallel between circuits 104 and 106. Each of GI circuits 102 can transmit a respective bit of a multibit data signal from circuit 104 to circuit 106.

Figure 2:
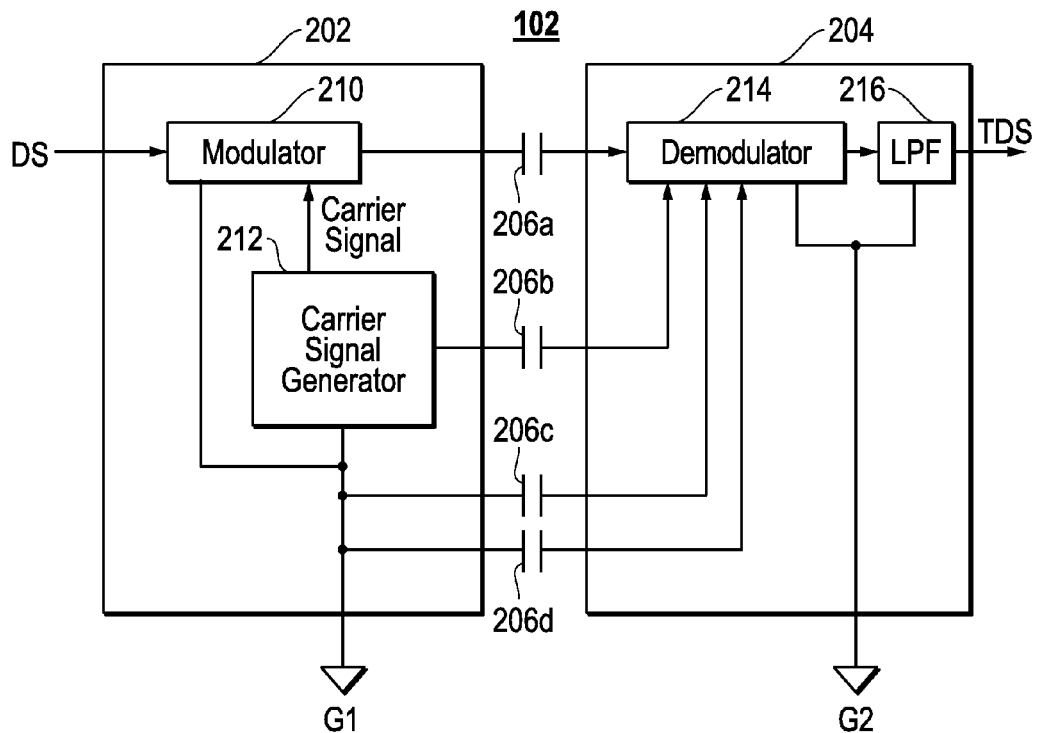
FIG. 2 is a block diagram illustrating an example of the galvanic isolation circuit shown in FIG. 1.

With continuing reference to FIG. 1, FIG. 2 illustrates, in block diagram form, relevant components of an example GI circuit 102. The GI circuit includes a transmitter 202 coupled to a receiver 204 via capacitors 206. The transmitter 202 is coupled to supply voltage V1 and ground G1, while receiver 204 is coupled to supply voltage V2 and ground G2.

Transmitter 202 includes a modulator 210 that receives a data signal DS from circuit 102 (not shown in FIG. 2). Transmitter circuit 202 also includes a carrier signal generator 212 that generates a carrier signal. Modulator 210 modulates the carrier signal using the data signal DS. Modulation is the process of varying one or more properties of a carrier signal with the data signal. There are many different modulation techniques. The most fundamental modulation techniques are based on keying such as phase-shift keying (PSK), frequency-shift keying (FSK), amplitude-shift keying (ASK), etc. The present invention will be described with reference to PSK modulation, it being understood the present invention should not be limited thereto.

The modulated carrier signal is transmitted to receiver 204 via capacitor 206a. The modulated carrier signal includes a DC component and AC components of different frequencies. Capacitor 206a filters the modulated carrier signal during transmission. More particularly, capacitor 206a blocks or removes the DC component and attenuates the low frequency AC components of the modulated carrier signal. Importantly, the modulated carrier signal transmitted to receiver 204 lacks the DC component.

The carrier signal generated by generator 212 is also transmitted to receiver 204 via capacitor 206b. A time delay is introduced before the carrier signal is transmitted to receiver 204. In one embodiment, the delay should substantially equal the time delay created by modulator 210. The delayed carrier signal includes a DC component and AC components. Capacitor 206b filters the delayed carrier signal during transmission. More particularly, capacitor 206b removes the DC component and attenuates the low frequency components of the delayed carrier signal. Importantly, the delayed carrier signal transmitted to receiver 204 lacks the DC component.

Receiver 204 includes a synchronous demodulator 214 and a low pass filter (LPF) 216. A demodulator is a device that performs demodulation, the inverse of modulation. Demodulator 214 demodulates the filtered, modulated carrier signal it receives via capacitor 206a using the filtered, delayed carrier signal it receives via capacitor 206b. The demodulated signal output from demodulator 214 is subsequently passed thru LPF 216 before it is transmitted to circuit 106 (not shown in FIG. 2) as the transmitted data signal TDS. This signal should include substantially all of the components of the data signal DS. In other words, the transmitted data signal is substantially the same as the data signal. In this manner, GI circuit 102 provides galvanic isolation while enabling data communication. In an embodiment that is alternative to that shown in FIG. 2, receiver 204 lacks LPF 216. In this alternative embodiment, the transmitted data signal takes form in the output of demodulator 214.

Common-mode transient immunity (CMTI) and radio frequency noise immunity (RFNI) are important characteristics of galvanic isolators. The output of a galvanic isolator can inadvertently switch to a low state when it should be high because of poor CMTI and/or RFNI. GI circuit in FIG. 2 includes capacitors 206c and 206d coupled between ground G1 and demodulator 214. Capacitor 206c and capacitor 206d transmit noise from ground G1 to demodulator. The transmitted noise can be injected into inputs of the demodulator in order to improve GI circuit 102's RFNI and/or CMTI.

Figure 3:
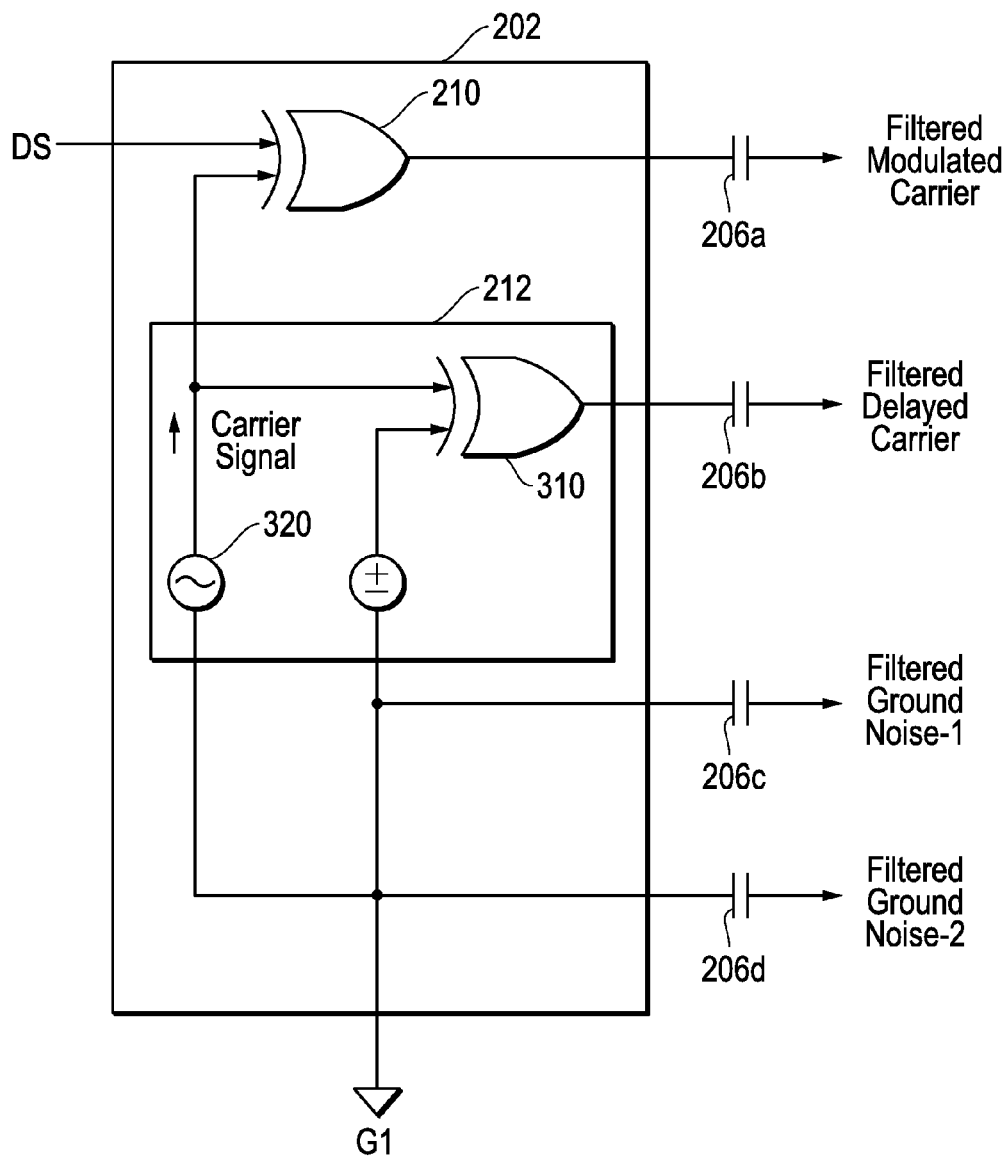
FIG. 3 is a diagram illustrating an example transmitter employed in the galvanic isolation circuit of FIG. 2.

FIG. 3 illustrates one embodiment of the transmitter 202a shown in FIG. 2. Generator 212 includes an oscillator 320 that generates a high frequency (e.g., 100 MHz or higher) sine or square wave carrier signal. For purposes of explanation only, oscillator 320 generates a square wave carrier signal. Modulator 210 takes form in an XOR gate, which implements carrier modulation by XORing the data signal DS and the square wave signal, the result of which is transmitted to demodulator 214 via capacitor 206a. A dummy XOR gate 310 XORs the square wave carrier signal and a DC voltage, the result of which is transmitted to demodulator 214 via capacitor 206b. Dummy XOR gate 310 delays the transmission of the carrier signal to demodulator 214. Dummy XOR gate 310 should be substantially similar in structure to XOR gate 210 so that the time delays created by the gates are substantially equal.

Capacitors 206a and 206b filter the outputs of XOR gates 310 and 312, respectively. In other words, capacitor 206a removes the DC component from the output signal of XOR gate 310 and attenuates some of the lower frequency components from the output signal of XOR gate 310, while 206b removes the DC component from the output signal of XOR gate 312 and attenuates some of the lower frequency components from the output signal of XOR gate 312. Capacitors 206c and 206d filter noise on ground G1 in similar fashion. It is noted that in an alternative embodiment, only one of the capacitors 206c and 206d is used to transmit noise from ground G1 to demodulator 214.

Figure 4:
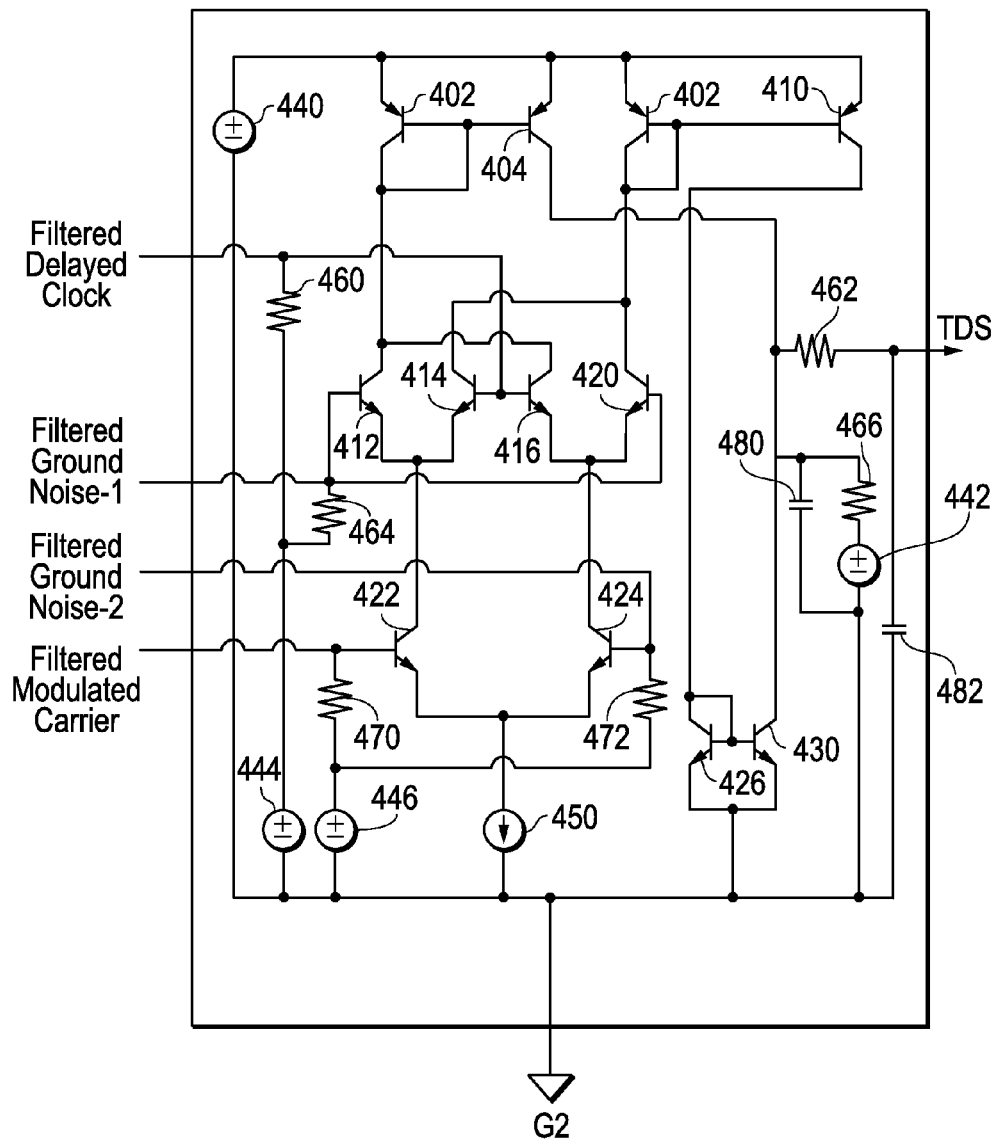
FIG. 4 is a schematic diagram illustrating an example used in the galvanic isolation circuit of FIG. 2.

FIG. 4 illustrates one embodiment of receiver 204 in schematic form that includes bipolar junction transistors (BJTs) 402-430 coupled to DC voltage sources 440-450, resistors 460-472, and capacitors 480-482 as shown. In this embodiment, demodulator 214 takes form in a differential multiplexor. The filtered, delayed carrier signal transmitted by capacitor 206b is input to one set of differential inputs (i.e., bases of BJTs 414 and 416) of the multiplexor, and the filtered, modulated carrier signal transmitted by capacitor 206a is input to another set of differential inputs (i.e., bases of BJTs 422 and 424). In addition, noise from ground G1 received via capacitor 206c, is injected into differential inputs (i.e., bases of BJTs 412 and 420), while noise from ground G1 received via capacitor 206d is injected into an input (i.e., base of BJT 424). In another embodiment, noise from ground G1 is injected into only the bases of BJTs 412 and 420 or the base of BJT 424, but not both.

The combination of transmitter and receiver shown in FIGS. 3 and 4 has been computer simulated. The computer simulation indicates GI circuit 102 has superior performance characteristics when compared to prior art galvanic isolators such as optocouplers that are currently available on the market. For example GI circuit 102 has a response time of 50 nsec or less. In contrast, commercially available optocouplers have a response time of 100 nsec or more. The propagation delay of the GI circuit 102 is 45 nsec or less, while the propagation delay of the commercially available optocouplers is at least 500 nsec. The RFNI and CMTI of GI circuit 102 are extremely strong when compared to the RFNI of commercially available optocouplers or capacitor based devices. The transmission bandwidth of commercially available capacitor based devices is limited to DC-150 KHz, whereas the bandwidth of GI circuit 102 goes up to DC-1 MHz.

Galvanic isolators are employed in many devices. For example, galvanic isolators are employed in high voltage power modules such as high voltage isolated DC-DC converters, isolated DC-AC converters, isolated AC-DC converters etc. These devices typically employ transformers, microcontrollers, half-bridges or full-bridges. Isolation is provided by the transformers. Drivers for half-bridges or full-bridges can be controlled by complementary, non-overlapping PWM signals generated by a microcontroller. The half-bridges or full-bridges and their drivers are connected to one side (e.g., the primary side) of the transformer, while the microcontroller is connected to the other side (e.g., the secondary side) of the transformer. Galvanic isolators can be used to isolate microcontrollers from the drivers of half-bridge or full-bridge, while transmitting the PWM signals therebetween.

Figure 5:
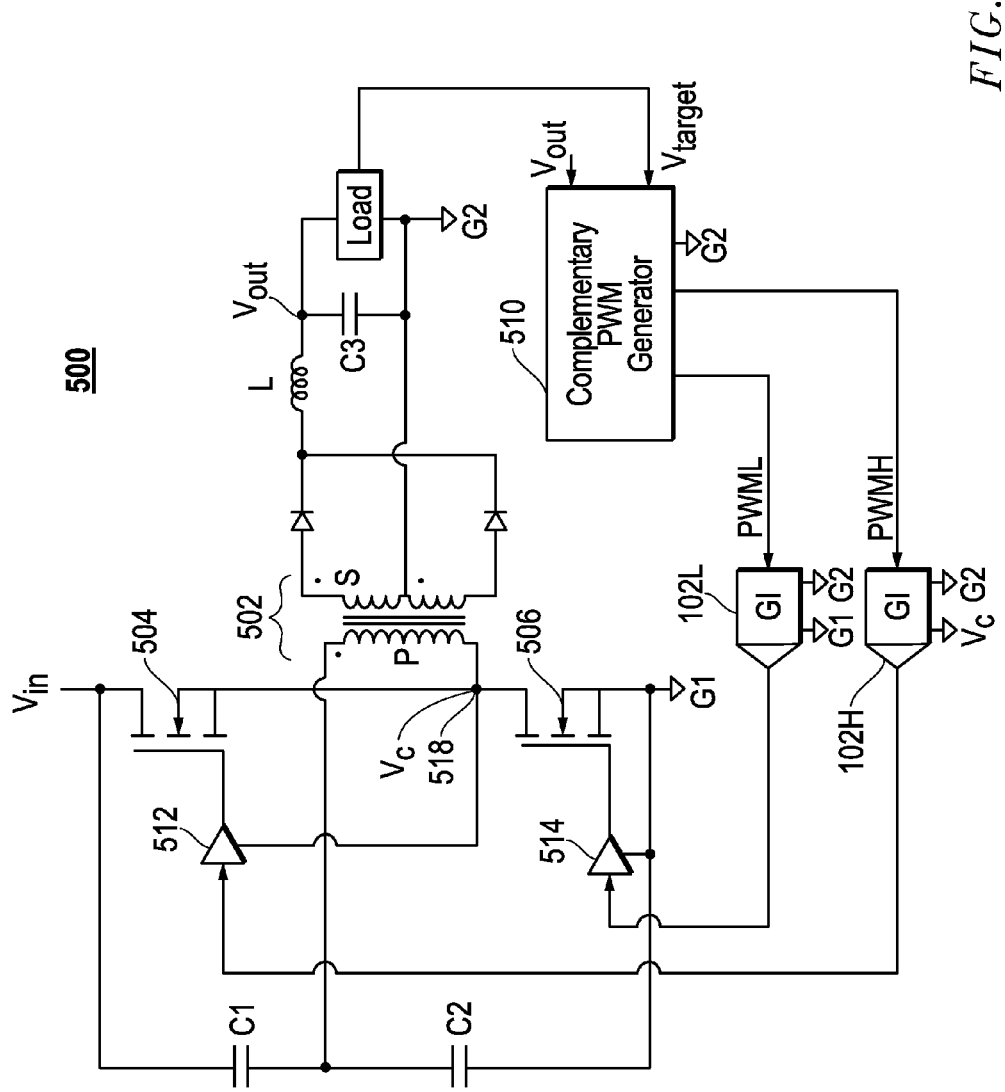
FIG. 5 is a diagram illustrating an example isolated DC-DC converter employing the galvanic isolation circuit of FIG. 2.

To illustrate, FIG. 5 shows one example of an isolated DC-DC converter 500 employing GI circuit 102. Isolated DC-DC converter 500 converts an input DC voltage Vin to an output voltage Vout for use by a load. FIG. 5 shows the load coupled between Vout and ground G2. Isolated DC-DC converter 500 includes a transformer 502 with a primary coil P and a secondary coil S. Transformer 502 isolates ground G1 from ground G2.

Primary coil P is coupled as shown to a half-bridge that includes high side and low side power switches 504 and 506, respectively. In the embodiment shown, switches 504 and 506 take form in silicon carbide (SiC) based power MOSFETs, which can switch reliably at high frequencies (e.g., 100 KHz, 200 KHz, or greater) compared to Si based power MOSFETs (20 KHz or lower). Alternative embodiments can employ different types of switches such as SiC IGBTs, gallium nitride (GaN) MOSFETs, GaN IGBTs, etc.

Switches 504 and 506 are controlled by drivers 512 and 514, respectively, which receive complimentary, non-overlapping PWM signals PWMH and PWML. The PWM signals are generated by PWM generator 510. PWM generator 510 inserts a dead time between pulses of PWML and PWMH. The dead time is designed to prevent concurrent activation of switch 504 and switch 506. One of ordinary skill understands the dead time is necessary to prevent current shoot-through from Vin to ground G1 via concurrently activated switches 504 and 506. As will be more fully described below, dead time insertion can turn into a problem with high switching frequencies of PWMH and PWML.

The ground point of PWM generator 510 is coupled to ground G2. The ground points of drivers 512 and 514 are coupled to common node 518 and G1, respectively, as shown. During operation of isolated DC-DC converter 500, the common voltage Vc at common node 518 swings in magnitude between Vin and ground G1. Since the ground point of driver 512 is coupled to Vc, which varies in magnitude, driver 512 is referred to as a floating driver.

GI circuit 102H galvanically isolates PWM generator 510 from driver 512. In other words, GI circuit 102H isolates ground G2 from Vc and transmits PWMH to driver 512. GI circuit 102L galvanically isolates PWM generator 510 from driver 514. In other words, GI circuit 102L isolates ground G2 from ground G1 and transmits PWML to driver 514.

Vout can be regulated by the load. During operation, PWM generator 510 receives a reference or target voltage Vtarget from the load and Vout. PWM generator 510, which may take form in a microcontroller, includes one or more analog-to-digital converters (ADCs) for converting Vout and Vtarget. PWM generator 510 can vary the duty cycle D of PWMH as a function of Vout and Vtarget. One of ordinary skill understands that the duty cycle D affects the magnitude of Vout; as the load increases or decreases Vtarget, PWM generator 510 increases or decreases duty cycle D until Vout equals Vtarget.

The size and cost of components (e.g., transformers, inductors, or capacitors) of isolated converters can be reduced if the half-bridge or full-bridge is driven with high frequency, complementary, non-overlapping PWM signals. But prior art galvanic isolators (e.g., optocouplers) cannot reliably transmit PWM signals that switch at high frequencies because of their poor response time, poor propagation delay, etc. In other words, prior art galvanic isolators are limited in use by their large response times, large propagation delays, weak RFNI, etc. GI circuits 102L and 102H, however, are capable of reliably transmitting PWM signals at higher switching frequencies (e.g., 100 KHz, 200 KHz, 1 MHz or greater) when compared to prior art isolators such as optocouplers.

As noted above, the size of isolator components can be reduced by increasing the switching frequency of the complementary, non-overlapping PWM signals that control the half-bride or full-bridge. However, as the switching frequency increases, the dead time shortens between pulses of the PWM signals. PWM generator 510 can reliably generate complementary, non-overlapping PWM signals when the dead time is several microseconds or larger. It is more difficult for PWM generator 510 to generate non-overlapping PWM pulses when the dead time is a microsecond or less. The drivers can also be a problem. Drivers 512 and/or 514 may be noisy or they may be slow in responding to pulses of PWMH and/or PWML. The noise or slow response time may result in inadvertent activation of both switches 504 and 506 at the same time, which in turn results in current shoot-through.

Figure 6:
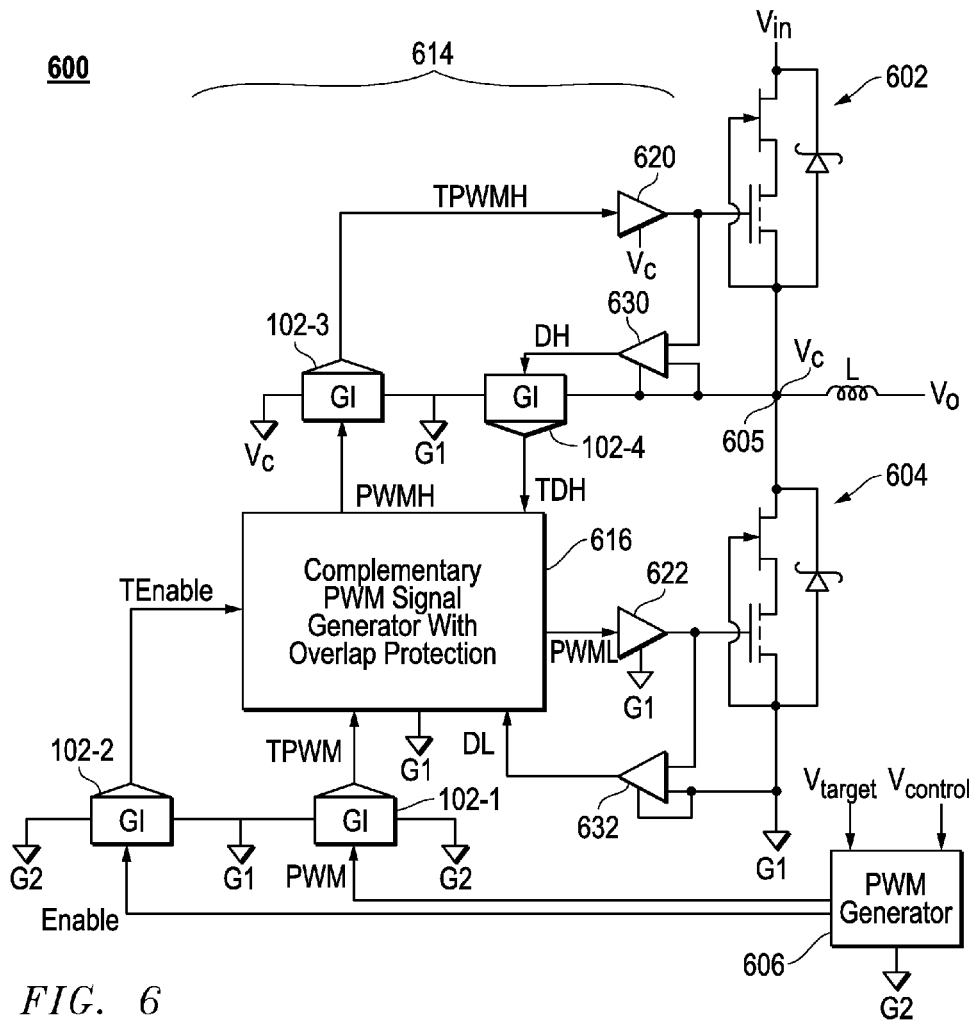
FIG. 6 is a diagram illustrating an example half-bridge circuit employing the galvanic isolation circuit of FIG. 2.

FIG. 6 illustrates relevant components of an example half-bridge circuit 600 that can be employed in a DC-DC converter, a DC-AC converter, AC-DC converter, etc. Half-bridge circuit 600 includes power switches 602 and 604 coupled together as shown between input voltage Vin and ground G1. In an alternative embodiment switches 602 and 604 are part of a full-bridge circuit that can be employed in a DC-DC converter, a DC-AC converter, AC-DC converter, etc. Half-bridge circuit 600 solves problems described above.

In the embodiment shown in FIG. 6, each of switches 602 and 604 take form in a silicon carbide (SiC) based JFET and Schottky barrier diode (SBD), which are coupled as shown to an Si based MOSFET. U.S. patent application Ser. No. 14/634,195, entitled Cascode Connected SiC-JFET with SiC-SBD and Enhancement Device, which is incorporated herein by reference in its entirety, describes examples of switches 602 and 604 in greater detail. Switches 602 and 604 can operate at fast switching frequencies (e.g., 100 KHz, 200 KHz, 1 MHz or higher). Other types of fast switches, including SiC or GaN based MOSFETs and IGBTs are contemplated for use in FIG. 6.

Switches 602 and 604 are coupled as shown to inductor L at common node 605. Voltage Vc at the common node 605 varies between Vin and ground G1 during operation of half-bridge circuit 600.

Half-bridge circuit 600 is controlled by PWM generator 606, which in turn is controlled by a load (e.g., a microprocessor not shown) via. PWM generator 606 generates a single PWM signal. One of ordinary skill in the art understands that PWM generator 606 cannot inadvertently generate overlapping, complementary PWM signal pulses. The duty cycle D of the single PWM pulse varies as a function of analog input signals Vtarget and Vcontrol. One or both of the input signals may be provided to PWM generator 606 by the load. In one embodiment, PWM generator 606 takes form in a microcontroller that includes ADCs for converting Vtarget and Vcontrol into digital equivalents, which in turn are processed by a CPU (not shown) of the microcontroller in accordance with instructions contained within memory. PWM generator 606 varies duty cycle D of the PWM pulse based upon inputs Vtarget and Vcontrol. PWM generator 606 may increase or decrease the duty cycle D until Vcontrol equals Vtarget. PWM generator 606 also generates an Enable signal that enables operation of the half-bridge circuit.

Half-bridge control circuit 614 controls switches 602 and 604 using the PWM signal and the Enable signal. Half-bridge control circuit 614 includes a complementary PWM signal generator 616, which generates non-overlapping, complementary PWM signals PWMH and PWML as a function of the PWM signal from PWM generator 606. PWMH and PWML signals control switches 602 and 604, respectively. As will be more fully described below, complementary PWM signal generator 616 uses feedback to prevent concurrent activation of switches 602 and 604 (i.e., current shoot-through). Complementary PWM signal generator 616 does not generate either PWMH or PWML unless the Enable signal is asserted.

The half-bridge control circuit 614 includes drivers 620 and 622 that drive gates of switches 602 and 604, respectively, in accordance with pulses of PWMH and PWML, respectively. With each pulse of PWMH, driver 620 drives the gate of switch 602 with a voltage that activates switch 602. Driver 620 is a floating driver with its ground point coupled to common voltage Vc, which varies at common node 605 during the operation of half-bridge circuit 600. With each pulse of PWML, driver 622 drives the gate of switch 604 with a voltage that activates switch 604. The ground point of driver 622 is coupled to ground G1.

As noted, PWM signal generator 616 generates non-overlapping, complementary PWM signals for controlling switches 602 and 604. PWM signal generator 616 has an automatic dead time or shoot-through prevention circuit that uses feedback to prevent concurrent activation of switches 602 and 604. Half-bridge control circuit 614 includes comparators 630 and 632, which provide switch status to complementary PWM signal generator 616. Comparator 630 asserts its output DH when switch 602 is activated. In other words, when Vgs of the MOSFET in switch 602 exceeds its threshold voltage Vth, comparator 630 asserts its output DH. Comparator 632 asserts its output DL when Vgs of the MOSFET in switch 604 exceeds its threshold voltage Vth. PWM signal generator 616 uses DH and DL to prevent overlapping of PWMH and PWML pulses, which in turn prevents current shoot-through from Vin to ground G1 via concurrently activated switches 602 and 604.

Half-bridge circuit 600 employs GI circuit 102-1-102-4 in order to galvanically isolate various components. Complementary PWM signal generator 616 is coupled to ground G1, while PWM signal generator 606 is coupled to ground G2. As noted, PWM signal generator 606 generates the PWM and Enable signals. GI circuits 102-1 and 102-2 galvanically isolate PWM generator 606 from complementary PWM signal generator 616. At the same time GI circuits 102-1 and 102-2 transmit the PWM and Enable signals, respectively, to PWM signal generator 616. The ground point of driver 620 is coupled to Vc, while the ground point of complementary PWM signal generator 616 is coupled to ground G1. GI circuit 102-3 galvanically isolates driver 620 from PWM signal generator 616. At the same time GI circuit 102-3 transmits PWMH to driver 620. The ground point of comparator 630 is coupled to Vc, while the ground point of complementary PWM signal generator 616 is coupled to ground G1. GI circuit 102-4 galvanically isolates comparator 630 from PWM signal generator 616. At the same time GI circuit 102-4 transmits DH to PWM signal generator 616.

As noted above, complementary PWM signal generator 616 has an automatic dead time feature that prevents concurrent activation of switches 602 and 604. This is very important when the switching frequency of PWM is very high (e.g., 100 KHz, 200 KHs, 1 MHz or higher). PWM signal generator 616 monitors DL and DH. PWM signal generator 616 will not assert PWMH if DL is asserted, and PWM generator 616 will not assert PWML if DH is asserted. Importantly, the GI circuits shown within FIG. 6 can operate at high frequencies with fast response times and minimal delay in transmitting signals such as PWMH and DH. Moreover the strong CMTI and RFNI characteristics reduce inadvertent simultaneous activation of switches 602 and 604. If alternative GI circuits, such as slower optocouplers, are employed instead of the GI circuit shown in FIG. 2, half-bridge circuit 600 may not be able to reliably operate at high frequencies of 100 kHz or higher.

Figure 7:
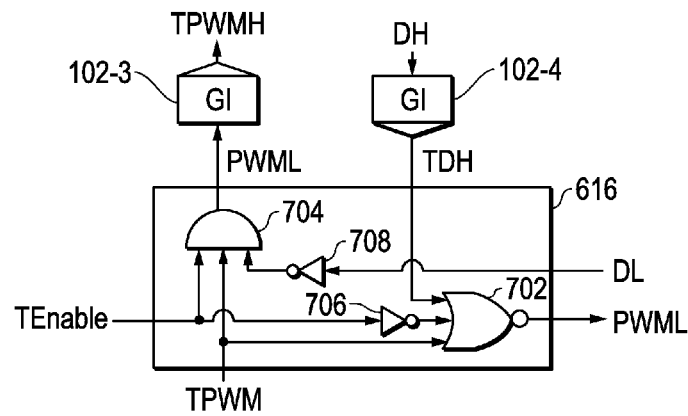
FIG. 7 is a diagram illustrating an embodiment of a complementary PWM signal generator with overlap protection that is employed in the half-bridge circuit of FIG. 6.

FIG. 7 illustrates one embodiment of the complimentary PWM signal generator 616. This circuit includes a NOR gate 702 that generates PWML, and an AND gate 704 that generates PWML. In particular, NOR gate 702 generates PWML as a function of DH transmitted by GI circuit 102-4, the inverse of Enable, and PWM, while the AND gate 704 generates PWML signal as function of Enable, PWM, and the inverse of DL. PWM signal generator 616 receives through feedback the signals DL and DH generated by the low side driver 622 and high side driver 102-4, respectively, for controlling the high side and low side switches 602 and 604. PWM signal generator 616 uses these feedback signals to ensure a dead time between pulses of PWMH and PWML. A lack of dead time between these pulses can result in current shoot-through from supply voltage Vin straight through to ground G1 via activated switches 602 and 604.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
a first switch coupled between a first voltage node and a common node;
a second switch coupled between the common node and a second voltage node;
a third switch coupled between the first voltage node and another common node;
a fourth switch coupled between the other common node and the second voltage node;
an inductor coupled to the common node and the other common node
a first circuit for generating a pulse width modulation (PWM) signal;
a second circuit for generating complementary, non-overlapping first and second PWM signals in response to the generation of the PWM signal, wherein the first and second PWM signals are used for controlling the first and second switches, respectively;
a first galvanic isolation (GI) circuit coupled between the first circuit and the second circuit.

2. An apparatus comprising:
a first switch coupled between a first voltage node and a common node;
a second switch coupled between the common node and a second voltage node;
a first circuit for generating a pulse width modulation (PWM) signal;
a second circuit for generating complementary, non-overlapping first and second PWM signals in response to the generation of the PWM signal, wherein the first and second PWM signals are used for controlling the first and second switches, respectively;
a first galvanic isolation (GI) circuit coupled between the first circuit and the second circuit;
a first driver comprising an output node coupled to the first switch;
a second GI circuit coupled between the second circuit and an input node to the first driver.

3. The apparatus of claim 2 further comprising a third GI circuit coupled between the output node of the first driver and the second circuit.

4. The apparatus of claim 1 wherein the first switch comprises a first silicon carbide transistor and a first silicon carbide diode, and wherein the second switch comprises a second carbide transistor and a second silicon carbide diode.

5. An apparatus comprising:
a first switch coupled between a first voltage node and a common node;
a second switch coupled between the common node and a second voltage node;
a first circuit for generating a pulse width modulation (PWM) signal;
a second circuit for generating complementary, non-overlapping first and second PWM signals in response to the generation of the PWM signal, wherein the first and second PWM signals are used for controlling the first and second switches, respectively;
a first galvanic isolation (GI) circuit coupled between the first circuit and the second circuit;

wherein the first GI circuit comprises a first capacitor coupled in series between the first circuit and the second circuit;

wherein the first GI circuit comprises a modulator and a demodulator with the first capacitor coupled in series between the modulator and the demodulator, wherein the modulator is configured to receive and modulate a first carrier signal using the PWM signal.

6. The apparatus of claim 5 wherein the first GI circuit comprises a first carrier signal generator and a second capacitor coupled in series between and the first carrier signal generator and the demodulator, wherein the first carrier signal generator is configured to generate the first carrier signal.

7. The apparatus of claim 6 wherein the first GI circuit further comprises a first low pass filter (LPF) circuit coupled in series between the demodulator and the second circuit, wherein the LPF circuit is configured to filter an output signal of the demodulator.

8. An apparatus comprising:
   a first galvanic isolation (GI) circuit comprising:
      a carrier signal generator for generating a carrier signal;
      a modulator for modulating the carrier signal using a signal received at an input of the modulator;
      a demodulator;
      a first capacitor coupled in series between the modulator and the demodulator;
      a second capacitor coupled in series between the carrier signal generator and the demodulator.

9. The apparatus of claim 8 wherein the demodulator is configured to demodulate a signal received from the modulator via the first capacitor, using a signal received from the carrier signal generator via the second capacitor.

10. The apparatus of claim 8 wherein the first GI circuit further comprises a low pass filter (LPF) coupled to the demodulator for low pass filtering an output signal of the demodulator.

11. The apparatus of claim 8 wherein the first GI circuit further comprises:
   a first ground node, wherein the modulator and the carrier signal generator are coupled to the first ground node;
   a third capacitor coupled in series between the first ground node and the demodulator.

12. The apparatus of claim 8 further comprising:
   a first circuit for generating a pulse width modulation (PWM) signal;
   wherein the first GI circuit is coupled to the first circuit;
   wherein the signal is the PWM signal.

13. The apparatus of claim 11 further comprising:
   a power converter comprising:
      a first switch coupled between a first voltage node and a common node;
      a second switch coupled between the common node and a second voltage node;
      an inductor coupled to the common node;

wherein the first GI circuit is coupled in series between the first circuit and the power converter.

14. The apparatus of claim 13 wherein the first switch comprises a first silicon carbide transistor and a first silicon carbide diode, and wherein the second switch comprises a second carbide transistor and a second silicon carbide diode.

15. The apparatus of claim 13 wherein the power converter further comprises:
   a second circuit coupled to receive an output signal from the first GI circuit;
   a first driver comprising an output node coupled to the first switch;
   a second GI circuit coupled between the second circuit and an input node of the first driver;
   a third GI circuit coupled between the second circuit and the output node of the first driver;
   wherein the second circuit is configured to generate first and second PWM signals for controlling the first and second switches, respectively;
   wherein the second circuit generates the first and second PWM signals as a function of the first GI circuit output signal, wherein the first and second PWM signals are complementary and non-overlapping.

16. A method comprising:
   a carrier signal generating circuit generating a carrier signal;
   a modulation circuit receiving an input signal and modulating the carrier signal using the input signal;
   a demodulation circuit demodulating a signal it receives from the modulation circuit via a first capacitor coupled in series between the modulation circuit and the demodulation circuit, using a signal the demodulation circuit receives from the carrier signal generating circuit via a second capacitor, which is coupled in series between the carrier signal generating circuit and the demodulation circuit.

17. The method of claim 15 where in the input signal comprises a pulse width modulation signal.

18. The method of claim 17 further comprising:
   generating complementary first and second pulse width modulation (PWM) signals as a function of the pulse width modulation signal;
   wherein the first and second PWM signals are used for controlling first and second switches, respectively of a half-bridge or full-bridge circuit;
   wherein the first PWM signal switches between states, wherein the state of the first PWM signal depends on a state of the second switch;
   wherein the second PWM signal switches between states, wherein the state of the second PWM signal state depends on a state of the first switch.

\* \* \* \* \*